United States Patent
Elias et al.

(10) Patent No.: US 8,992,078 B2
(45) Date of Patent: Mar. 31, 2015

(54) MEASURING A TEMPERATURE DURING CONTACTLESS TRANSMISSION OF ENERGY

(75) Inventors: Björn Elias, Hepberg (DE); Florian Schmidt, Elsterberg (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/809,084

(22) PCT Filed: Jul. 5, 2011

(86) PCT No.: PCT/EP2011/003315
§ 371 (c)(1),
(2), (4) Date: Jan. 8, 2013

(87) PCT Pub. No.: WO2012/003957
PCT Pub. Date: Jan. 12, 2012

(65) Prior Publication Data
US 2013/0114640 A1    May 9, 2013

(30) Foreign Application Priority Data

Jul. 9, 2010   (DE) .......................... 10 2010 026 780

(51) Int. Cl.

| | | |
|---|---|---|
| *G01K 1/00* | (2006.01) | |
| *G01K 13/00* | (2006.01) | |
| *B60L 3/00* | (2006.01) | |
| *B60L 11/18* | (2006.01) | |
| *H01M 10/44* | (2006.01) | |
| *H02J 7/02* | (2006.01) | |
| *H02J 7/04* | (2006.01) | |

(52) U.S. Cl.
CPC ............... *G01K 13/00* (2013.01); *B60L 3/0092* (2013.01); *B60L 11/182* (2013.01); *H01M 10/443* (2013.01); *H02J 7/025* (2013.01); *H02J 7/027* (2013.01); *H02J 7/047* (2013.01); *B60L 2240/36* (2013.01); *Y02T 10/7005* (2013.01); *Y02T 10/7088* (2013.01); *Y02T 90/122* (2013.01); *Y02T 90/14* (2013.01)
USPC ......................................................... 374/100

(58) Field of Classification Search
CPC combination set(s) only.
See application file for complete search history.

(56) References Cited

U.S. PATENT DOCUMENTS

| 5,654,621 | A   * | 8/1997  | Seelig ............................. 320/108 |
|---|---|---|---|
| 6,462,551 | B1  * | 10/2002 | Coates et al. .................. 324/431 |
| 7,444,210 | B2  * | 10/2008 | Breed et al. ........................ 701/1 |
| 2002/0056233 | A1 * | 5/2002 | Gohara ............................ 49/360 |
| 2002/0057075 | A1  | 5/2002  | Takashige et al. |
| 2003/0030411 | A1  | 2/2003  | Ayano et al. |
| 2006/0033468 | A1 * | 2/2006 | Zhu et al. ......................... 320/104 |
| 2008/0164839 | A1 * | 7/2008 | Kato et al. ....................... 320/108 |
| 2008/0272742 | A1 * | 11/2008 | Hart et al. ........................ 320/150 |
| 2009/0278523 | A1  | 11/2009 | Yoda et al. |

(Continued)

FOREIGN PATENT DOCUMENTS

| DE | 102005038345 | 2/2007 |
|---|---|---|
| DE | 202009009689 | 11/2010 |
| EP | 2 253 345 | 1/1988 |

(Continued)

*Primary Examiner* — Lisa Caputo
*Assistant Examiner* — Nasir U Ahmed
(74) *Attorney, Agent, or Firm* — Henry M. Feiereisen LLC.

(57) ABSTRACT

During contactless transmission of energy between a receiver (6) for receiving the energy and a transmitter (7) for transmitting the energy for the purpose of charging a battery of a motor vehicle (1), a temperature is measured in a region between the transmitter (7) and the receiver (6).

14 Claims, 1 Drawing Sheet

(56) References Cited

U.S. PATENT DOCUMENTS

2011/0074346 A1* 3/2011 Hall et al. .................... 320/108
2011/0187317 A1* 8/2011 Mitake et al. ................ 320/108

FOREIGN PATENT DOCUMENTS

| EP | 1 944 851 | 7/2008 |
| WO | WO 2009/081115 | 7/2009 |

* cited by examiner

MEASURING A TEMPERATURE DURING CONTACTLESS TRANSMISSION OF ENERGY

CROSS-REFERENCES TO RELATED APPLICATIONS

This application is the U.S. National Stage of International Application No. PCT/EP2011/003315, filed Jul. 5, 2011, which designated the United States and has been published as International Publication No. WO 2012/003957 and which claims the priority of German Patent Application, Serial No. 10 2010 026 780.5, filed Jul. 9, 2010, pursuant to 35 U.S.C. 119(a)-(d).

BACKGROUND OF THE INVENTION

The invention relates to the contactless transmission of energy for charging a battery of a motor vehicle.

A charging process of traction batteries in electric or hybrid vehicles is normally executed in the absence of a person during the entire changing process. Therefore, this process has to be designated primarily as an unsupervised charging.

Contactless transmission of energy generates a high magnetic flux density which is especially great in the region between the transmitter of energy and the receiver of the energy. This magnetic field heats metallic and electrically conductive articles. Under certain circumstance, these articles may heat up to such an extent as to cause fire or burns.

SUMMARY OF THE INVENTION

Against this background, it is the object of the invention to render the contactless transmission of energy for charging a battery of a motor vehicle safer.

This object is achieved by the inventions set forth in the independent claims. Advantageous configurations are set forth in the dependent patent claims.

Accordingly, an apparatus for the contactless transmission of energy for charging a battery of a motor vehicle includes a receiver for receiving energy which is transmitted by a transmitter for transmitting the energy. The apparatus further includes a measuring device for measuring a temperature in a region between the transmitter and the receiver.

This region covers in its vertical orientation in particular the bottom-near space in which articles may be present. In its horizontal orientation, the region covers preferably the entire space in which the electromagnetic field required for charging extends at a field strength which can cause an inadmissible heating of articles. This includes in particular the space which is bounded by an imaginary connection between the transmitter and the receiver but preferably is expanded beyond to cover also a space which is adjacent thereabout by 10 cm, further preferred by 30 cm, and is ascertained by the measuring device.

Thus, control is possible at any time during transmission of energy, i.e. during a charging process, as to whether an article in the intermediate space between transmitter and received is heated inadmissibly or has exceeded a limit temperature.

The transmitter and/or the receiver are configured preferably as coils, in particular as primary and secondary coils, between which an intermediate space exists during the contactless transmission of energy.

The receiver is arranged in particular on the motor vehicle. An arrangement at the subfloor of the motor vehicle is especially preferred here because an energy transmission becomes especially effective. The transmitter is arranged in particular on or underneath the surface of a subsoil suitable for driving on it, for example in the form of a roadway, so that the motor vehicle can be parked for a contactless transmission of energy via the transmitter.

The measuring device for measuring a temperature preferably includes a sensor system with one or more sensors, arranged at the subfloor of the motor vehicle. The sensors are preferably configured as sensors which measure and/or pinpoint heat radiation. The sensors preferably further have a directivity, with several sensors being arranged with different measuring devices.

The battery is preferably a traction battery producing energy which can be used for propelling a wheel of the motor vehicle.

Further, the apparatus can preferably be controlled in dependence on the temperature measured by the measuring device, with the contactless transmission of energy for charging the battery being interruptible and/or the energy transmitted per time unit being reducible, during measuring a temperature and/or a temperature change that indicates the presence of a heated article between the transmitter and the receiver.

The apparatus is intended to detect interfering foreign bodies (and precisely only interfering ones) in the intermediate space between primary and secondary coils of the contactless energy transmission by using a temperature measurement (remote measurement).

A motor vehicle includes an apparatus of the afore-mentioned type.

In a method for the contactless transmission of energy for charging a battery of a motor vehicle between a receiver for receiving energy and a transmitter for transmitting the energy, a temperature is measured between the transmitter and the receiver and the method is controlled in dependence on the measured temperature.

BRIEF DESCRIPTION OF THE DRAWING

Further features and advantages of the invention will be described by way of an exemplary embodiment with reference to the drawing. It is shown in.

DETAILED DESCRIPTION OF PREFERRED EMBODIMENTS

Figure 1:
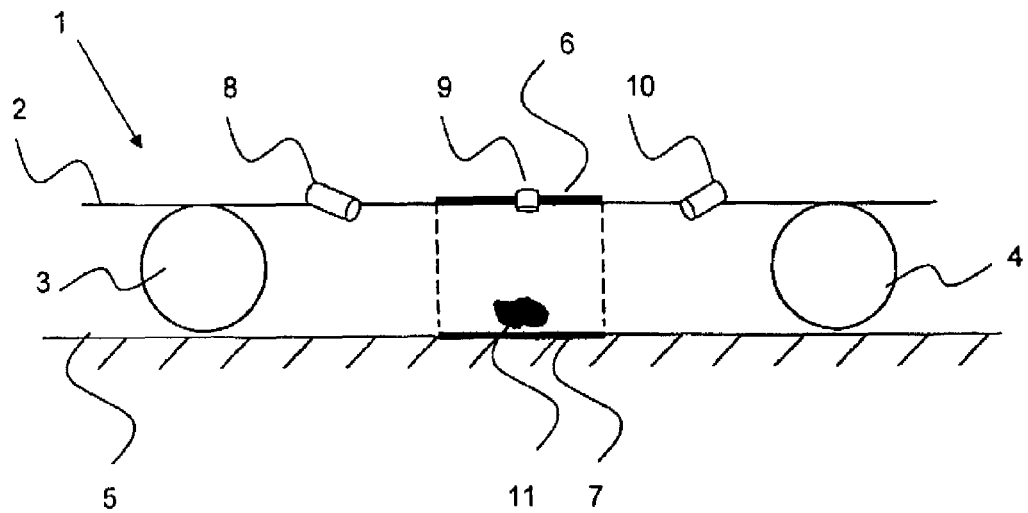
FIG. 1 a side view of a motor vehicle.
Figure 2:
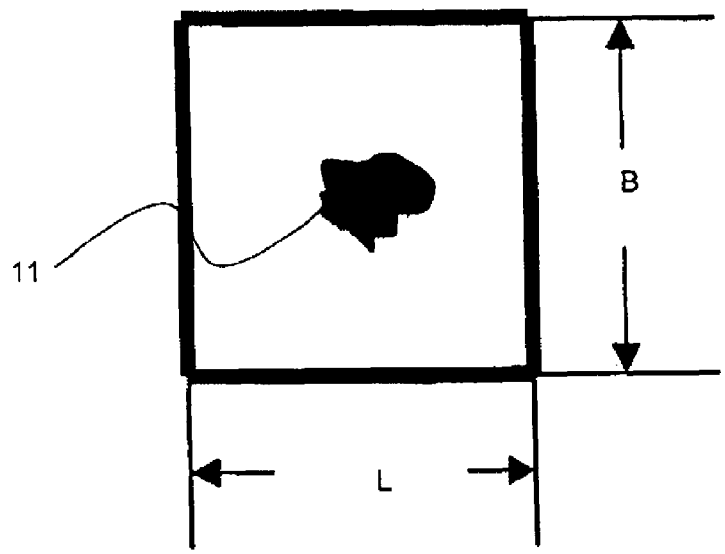
FIG. 2 a plan view of an article located underneath the motor vehicle.

FIG. 1 shows a motor vehicle 1 with a subfloor 2 and wheels 3, 4 standing on a roadway 5.

One or more of the wheels 3, 4 are propelled by an electric motor which receives energy from a traction battery. This battery can be charged by an apparatus for the contactless transmission of energy, including a receiver 6 for receiving the energy for charging. The receiver 6 is configured as a coil in the subfloor 2 of the motor vehicle 1.

The receiver 6 of the apparatus for the contactless transmission of energy receives the energy for charging the battery from a transmitter 7 which is arranged on the roadway 5.

The apparatus for the contactless transmission of energy includes a measuring device for measuring a temperature between the transmitter and the receiver, including a sensor system having three sensors 8, 9, 10 and arranged on the subfloor (underbody) 2 of the motor vehicle 1. According to an especially cost-efficient variation, the sensor system may include only one sensor 9. The sensor or sensors may hereby be situated directly on the receiver 6 or at another position in the region of the subfloor 2. The sensors 8, 9, 10 detect the region being monitored from different directions.

One sensor 9 is hereby arranged at the receiver 6 and has a measuring direction directly downwards towards the transmitter 7. Further sensors 8, 10 are arranged to the side of the intermediate space between receiver 6 and transmitter 7 and have measuring directions into this intermediate space. The sensors 8 and 10 are located at opposite sides of the intermediate space.

During the charging process, at least one of the sensors 8, 9, 10 is able to ascertain the temperature or change in temperature in the space between the coils. A single sensor 8, 9, or 10 may be sufficient to ensure reliability of the surveillance. As a result, heated articles or a heating of an article 11 situated in the region being monitored, via which the energy is transmitted to a relevant extent by an electromagnetic field, is recognized and the charging process can be interrupted and/or the charge output can be reduced. Thus, the high magnetic flux density poses no longer any problem during the charging process with respect to heating of conductive articles because especially intensely heated articles, e.g. a can, key, ring or metal sheet, are detected by the measuring device with its sensor system 8, 9, 10 integrated at the subfloor 2 of the vehicle.

The invention claimed is:

1. Apparatus for the contactless transmission of energy for charging a battery of a motor vehicle, said apparatus comprising:
   a transmitter for transmitting energy;
   a receiver receiving energy from the transmitter; and
   a measuring device measuring a temperature in a region between the transmitter and the receiver, said measuring device including a plurality of sensors arranged on an underbody of the motor vehicle, two of the sensors being arranged outside an intermediate space which is defined between the receiver and the transmitter during a charging process and exposed to an electromagnetic field, said two of the sensors being arranged at opposite sides of the intermediate space and having measuring directions pointing towards the intermediate space.

2. The apparatus of claim 1, wherein the measuring device is constructed to detect when an article in the intermediate space exceeds a temperature limit value.

3. The apparatus of claim 1, wherein the receiver is configured as a coil.

4. The apparatus of claim 1, wherein the receiver is arranged on the motor vehicle.

5. The apparatus of claim 1, wherein the battery is a traction battery.

6. The apparatus of claim 1, wherein the apparatus is controllable in one of two ways, a first way in which the contactless transmission of energy for charging the battery is interrupted when the measuring device detects in the intermediate space the presence of an article that is heated to a temperature which exceeds a temperature limit, a second way in which energy transmitted by the transmitter to the receiver per time unit is reduced when measuring device detects in the intermediate space the presence of an article that is heated to a temperature which exceeds a temperature limit.

7. The apparatus of claim 1, wherein said two sensors are arranged at two opposite sides of the intermediate space between the transmitter arranged on the roadway and the receiver arranged on the underbody of the vehicle.

8. A motor vehicle, comprising:
   a battery; and
   an apparatus for the contactless transmission of energy for charging the battery, said apparatus including a transmitter for transmitting energy, a receiver receiving energy from the transmitter, and a measuring device measuring a temperature in a region between the transmitter and the receiver, said measuring device including a plurality of sensors arranged on an underbody of the motor vehicle, two of the sensors being arranged outside an intermediate space which is defined between the receiver and the transmitter during a charging process and exposed to an electromagnetic field, said two of the sensors being arranged at opposite sides of the intermediate space and having measuring directions pointing towards the intermediate space.

9. The motor vehicle of claim 8, wherein the measuring device is constructed to detect when an article in the intermediate space exceeds a temperature limit value.

10. The motor vehicle of claim 8, wherein the receiver is configured as a coil.

11. The motor vehicle of claim 8, wherein the receiver is arranged on the motor vehicle.

12. The motor vehicle of claim 8, wherein the battery is a traction battery.

13. The motor vehicle of claim 8, wherein the apparatus is controllable in one of two ways, a first way in which the contactless transmission of energy for charging the battery is interrupted when the measuring device detects in the intermediate space the presence of an article that is heated to a temperature which exceeds a temperature limit, a second way in which energy transmitted by the transmitter to the receiver per time unit is reduced when the measuring device detects in the intermediate space the presence of an article that is heated to a temperature which exceeds a temperature limit.

14. The motor vehicle of claim 8, wherein said two sensors are arranged on opposite sides of the intermediate space between the transmitter arranged on the roadway and the receiver arranged on the underbody of the motor vehicle.

* * * * *